United States Patent Office 3,681,310
Patented Aug. 1, 1972

3,681,310
PROCESS FOR SUSPENSION POLYMERIZATION OF VINYL-TYPE MONOMERS
Kizyu Moriyama and Takeshi Moriwaki, Osaka, Japan, assignors to Daicel Ltd., Osaka, Japan
No Drawing. Filed Aug. 26, 1971, Ser. No. 175,379
Claims priority, application Japan, Aug. 28, 1970, 45/75,408
Int. Cl. C08f 3/76, 3/30, 7/04
U.S. Cl. 260—85.5 R    3 Claims

ABSTRACT OF THE DISCLOSURE

Suspension polymerization of vinyl monomer is carried out in an aqueous suspension medium containing (A) 0.5 to 5.0 parts by weight, per 100 parts by weight of the vinyl monomer to be polymerized, of a suspension stabilizer selected from the group consisting of secondary calcium phosphate, tertiary calcium phosphate and mixtures thereof, and (B) 0.01–5.0% by weight, based on the water content of the aqueous suspension medium, of primary potassium phosphate.

BACKGROUND OF THE INVENTION

Field of the invention

This invention relates to a process for the suspension polymerization of vinyl-type monomers. More specifically, it relates to a process for the suspension polymerization of vinyl-type monomers in which calcium phosphate of low solubility in water is used as the suspension stabilizer, in the presence of primary potassium phosphate.

Description of the prior art

Conventional suspension stabilizers used for suspension polymerizing vinyl-type monomers in an aqueous medium are roughly divided into two types, namely, water-soluble high molecular weight substances and inorganic or organic metal salts of low solubility in water. However, both of these types of suspension stabilizers are not fully satisfactory. Among suspension stabilizers of the latter type, namely, inorganic or organic metal salts of low solubility in water, calcium phosphate is most frequently used in general. Only tertiary calcium phosphate ($Ca_3(PO_4)_2$) is used because secondary calcium phosphate ($CaHPO_4$) does not give a stable suspension state. However, the above-mentioned tertiary calcium phosphate is also defective in the following points:

(1) The range of operation in the polymerization process is limited.
(2) Even if polymerizations are carried out under the same conditions, a stable suspension state cannot be attained with good reproducibility.
(3) In order to attain a stable suspension state, it is necessary to use a large amount of said tertiary calcium phosphate, which results in degradation of the properties of the resulting polymer caused by the suspension stabilizer remaining in the polymer.

As a method for overcoming the above defects of tertiary calcium phosphate, there has been developed a method in which an anionic surface active agent is used as a suspension assistant, in combination with calcium phosphate as the suspension stabilizer. In this method, tertiary calcium phosphate is used as the calcium phosphate suspension stabilizer and it is impossible to avoid the undesired phenomenon that the suspension stabilizer is included and occluded in the resulting polymer.

With a view to developing a process for polymerizing vinyl-type monomers using calcium phosphate as the suspension stabilizer and which will overcome the above defects, we have made intensive research and have discovered that when the calcium phosphate suspension stabilizer is used in the presence of primary potassium phosphate, all of the above defects can be completely overcome. Based on this finding, we have now made the present invention.

SUMMARY OF THE INVENTION

Accordingly, this invention provides a suspension polymerization process which comprises the steps of suspension polymerizing a vinyl-type monomer with the use of secondary calcium phosphate and/or tertiary calcium phosphate as the suspension stabilizer, in which primary potassium phosphate is present in the aqueous suspension medium in an amount of 0.01–5.0% by weight, based on the water content of the aqueous suspension medium.

Primary potassium phosphate ($KH_2PO_4$) to be used in this invention is soluble in water (the solubility being 14.8 g./100 g. at 0° C. and 83.5 g./100 g. at 90° C.) and its aqueous solution is weakly acidic. Thus, the properties of this suspension assistant are quite different from those of conventional suspension assistants such as anionic surface active agents. Although the mechanism of the function of primary potassium phosphate has not been completely elucidated, it is presumed that, in an aqueous medium containing a suspension stabilizer of the calcium phosphate type, the surface condition of the fine particles of the calcium phosphate suspension stabilizer is varied by the interaction between primary potassium phosphate and calcium phosphate and the accompanying hydrolysis and, in the interfacial surface between the viny monomer particles and the aqueous medium, the oriented adsorption of the calcium phosphate tends to easily occur.

In this invention, the kind of vinyl monomer to be used is not critical, and a variety of known vinyl-type monomers may be used in this invention. Either homopolymerization of one monomer or copolymerization of two or more monomers can be similarly accomplished conveniently. As typical examples of the vinyl-type monomer there may be cited styrene, acrylonitrile, methyl methacrylate and vinyl chloride.

As the suspension stabilizer, there may be used secondary calcium phosphate ($CaHPO_4$) and/or tertiary calcium phosphate ($Ca_3(PO_4)_2$), and a product composed mainly of such calcium phosphates, such as hydroxylapatite ($[Ca(PO_4)_2]_3 \cdot Ca(OH)_2$).

Commercially available fine particles of these calcium phosphates may be used without change, but in view of the particle size and purity, it is preferable to synthesize the suspension stabilizer in the polymerization system by the double decomposition technique by adding an aqueous solution of sodium phosphate and an aqueous solution of calcium chloride to the polymerization system prior to the initiation of the polymerization.

A suitable amount of primary potassium phosphate to be used in the process of this invention is 0.01–5.0 parts by weight per 100 parts by weight of the water used as the aqueous suspension medium. If the amount used of primary potassium phosphate is below the above range, the calcium phosphate suspension stabilizer will be included and occluded in the resulting polymer beads and therefore, the product will become opaque. If the amount used of primary potassium phosphate is larger than the above range, the suspension polymerization cannot be conducted stably or smoothly.

A suitable amount of the calcium phosphate suspension stabilizer (either secondary or tertiary) to be used in the process of this invention is 0.5–5.0 parts by weight per 100 parts by weight of the vinyl-monomer to be polymerized.

In this invention the polymerization temperature is not critical, but it is preferred that the polymerization be carried out at a temperature in the range of from 60 to 100° C.

Known ordinary polymerization initiators may be used in this invention. As suitable polymerization initiators, there may be exemplified lauryl peroxide, benzoyl peroxide, tertiary butyl perisobutyrate and azobisisobutyronitrile. The amount to be added of such polymerization initiator varies depending on the kind of the monomer, the polymerization temperature, the kind of the polymerization initiator and other factors, but it is generally used in an amount of 0.2–0.7% by weight based on the weight of the vinyl-type monomer.

In this invention there may be used, in addition to the polymerization initiator, such additives as surface active agents, chain regulators, plasticizers, discoloration inhibitors, and coloring materials, in accordance with known techniques.

In accordance with the above-mentioned process of this invention, a good suspension stability is attained in the suspension polymerization of vinyl-type monomers and, therefore, operations on an industrial scale can be accomplished very stably. Further, the resulting polymer is free of beads made opaque by the presence of the suspension stabilizer included and occluded therein, and the polymer is excellent in transparency. Still further, the product according to this invention is excellent in heat stability and other properties.

This invention will now be further explained by referring to the following illustrative examples.

EXAMPLE 1

A 2-liter, four-neck flask equipped with a stirrer, a reflux condenser and a thermometer was charged with 10 cc. of an aqueous solution containing 3.59 g. of calcium chloride, 0.61 g. of primary potassium phosphate, 4.5 cc. of a 1% aqueous solution of "Monogen LH" (sodium sulfonate of higher alcohol manufactured by Daiichi Kogyo Seiyaku) and 185 cc. of deionized water (the water used in this and in the subsequent examples was deionized water). The mixture was heated at 55° C. with agitation, and then 12 g. of secondary sodium phosphate dodecahydrate ($Na_2HPO_4 \cdot 12H_2O$) dissolved in 100 cc. of water was gradually added dropwise to the mixture to form an aqueous medium containing secondary calcium phosphate as the suspension stabilizer. Then, the aqueous medium was heated to 70° C. and a mixture consisting of 140 g. of styrene, 90 g. of acrylonitrile, 0.8 g. of lauryl peroxide and 0.54 g. of tertiary dodecyl mercaptan was charged into the flask with agitation. The polymerization was effected in a nitrogen atmosphere at 70° C. with agitation. After the initiation of the polymerization, 70 g. of styrene was continuously added dropwise over a period of 5 hours. The polymerization temperature was maintained at 70° C. and when the conversion to polymer reached at 80%, nitrogen gas was blown into the polymerization system. Under this condition the polymerization was continued for 1 hour at 70° C. Then, the temperature was gradually raised to 80° C. over a period of 2 hours, and the polymerization was further carried out for an additional period 1 hour at 80° C. to complete the polymerization. A stable suspension state was maintained throughout the polymerization. Then, the temperature of the reaction mixture was lowered below 40° C. and 7 cc. of concentrated hydrochloric acid was added thereto, followed by agitation for about 30 minutes. The precipitate was separated by filtration and dried. There were obtained 281 g. of styrene-acrylonitrile copolymer beads of an average particle size of 40–60 mesh; which copolymer was excellent in transparency and heat stability.

As a result of X-ray diffraction analysis, it was found that the secondary calcium phosphate synthesized as described above had a purity exceeding 95%.

Comparative Example 1

The polymerization was carried out in the same manner as described in Example 1 except that primary potassium phosphate was not used. Among the resulting styrene-acrylonitrile copolymer beads, there were present many beads in which the calcium phosphate suspension stabilizer was included and occluded and which beads were opaque.

EXAMPLE 2

A 2-liter, four-neck flask equipped with a stirrer, a reflux condenser and a thermometer was charged with a solution of 4.82 g. of calcium chloride in 100 cc. of water, 4.5 cc. of a 1% aqueous solution of "Monogen LH" (sodium sulfonate of higher alcohol manufactured by Daiichi Kogyo Seiyaku) and 107 cc. of water. The mixture was heated to 60° C. and a solution of 0.30 g. of primary potassium phosphate and 11.3 g. of tertiary sodium phosphate ($Na_3PO_4$) in 93 cc. of water was added thereto to form a suspension stabilizer-containing aqueous medium. The subsequent steps were conducted in the same manner as in Example 1. Thus, there were obtained 279 g. of styrene-acrylonitrile copolymer beads of an average particle size of 40–60 mesh, which beads were excellent in transparency and heat resistance.

Comparative Example 2

The polymerization was carried out in the same manner as in Example 2 except that primary potassium phosphate was not used. Among the resulting styrene-acrylonitrile copolymer beads, there were present many beads in which the calcium phosphate suspension stabilizer was included and occluded and which beads were opaque.

EXAMPLE 3

A suspension stabilizer-containing aqueous medium was prepared in the same manner as in Example 1, and after the temperature of the medium was raised to 70° C., a mixture consisting of 210 g. of styrene, 90 g. of acrylonitrile, 0.90 g. of lauryl peroxide and 0.78 g. of tertiary dodecyl mercaptan was added to the aqueous medium with agitation. The polymerization was initiated in a nitrogen atmosphere and was continued for 10 hours at 70° C. Then, the temperature was gradually elevated to 80° C. over a period of 2 hours, and further polymerization was carried out at 80° C. for an additional period of 1 hour to complete the polymerization. The after-treatments were conducted in the same manner as in Example 1 to obtain 291 g. of styrene-acrylonitrile copolymer beads excellent in transparency.

COMPARATIVE EXAMPLE 3

The polymerization was carried out in the same manner as in Example 3 except that the suspension stabilizer-containing aqueous medium was prepared without using primary potassium phosphate. The resulting styrene-acrylonitrile copolymer beads were opaque and the yield was 288 g.

The embodiments of the invention in which an exclusive property or privilege is claimed are defined as follows:

1. In a process for the suspension polymerization of vinyl monomers in which one or more vinyl monomers is polymerized by suspension polymerization in an aqueous medium, the improvement which comprises incorporating in said aqueous medium a suspension stabilizer selected from the group consisting of secondary calcium phosphate, tertiary calcium phosphate and mixtures thereof, and also incorporating in said aqueous medium 0.01–5.0% by weight, based on the weight of water in the aqueous medium, of primary potassium phosphate.

2. A process according to claim 1, in which said suspension stabilizer is incorporated in said aqueous medium by adding an aqueous solution of calcium chloride and an aqueous solution of a sodium phosphate to form said suspension stabilizer in situ in said aqueous medium.

3. A process according to claim 1, in which the aqueous medium contains from 0.5 to 5.0 parts by weight of said suspension stabilizer, per 100 parts by weight of the vinyl monomer to be polymerized

References Cited

UNITED STATES PATENTS

| | | | |
|---|---|---|---|
| 2,687,408 | 8/1954 | Grim | 260—85.5 D |
| 2,715,118 | 8/1955 | Grim | 260—85.5 D |
| 3,442,880 | 5/1969 | White | 260—85.5 D |

HARRY WONG, JR., Primary Examiner

U.S. Cl. X.R.

260—80.6, 80.81, 86.1 R, 87.5, 88.1 P, 88.7 D, 89.5 A, 89.5 AW, 92.8 W, 93.5 W